Figure 1:
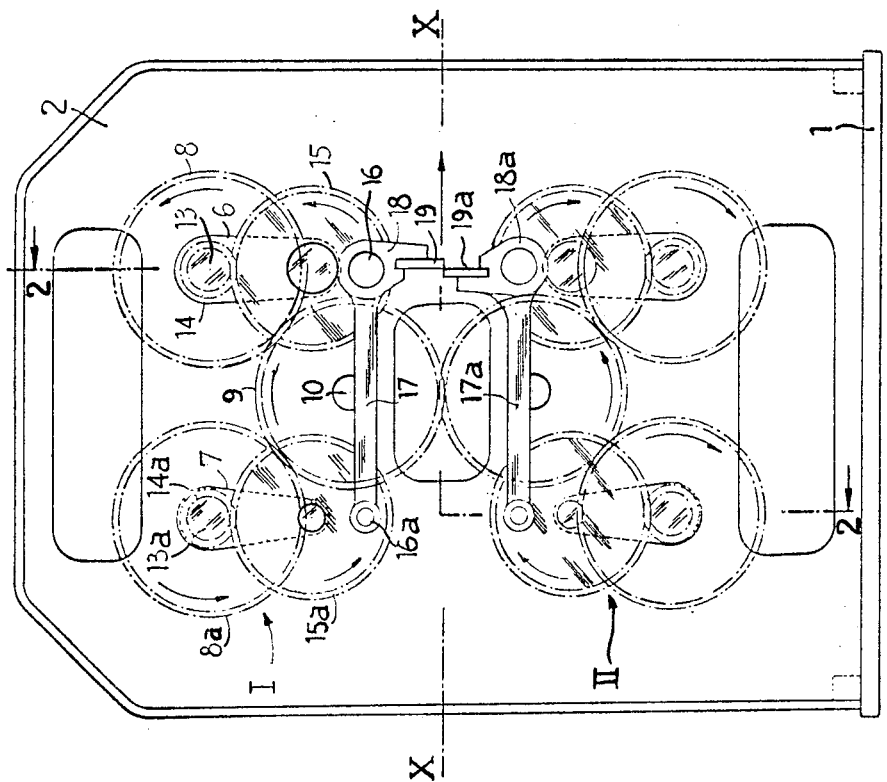

Aug. 30, 1966  H. J. ELINEAU  3,269,245
FLYING SHEAR WITH CONSTANTLY ORIENTED TOOL AND MISCUT FEATURES
Filed Feb. 23, 1965  4 Sheets-Sheet 1

INVENTOR.
HUBERT J. ELINEAU
BY
Henry C. Westin
HIS ATTORNEY

INVENTOR.
HUBERT J. ELINEAU
BY
HIS ATTORNEY

Aug. 30, 1966  H. J. ELINEAU  3,269,245
FLYING SHEAR WITH CONSTANTLY ORIENTED TOOL AND MISCUT FEATURES
Filed Feb. 23, 1965  4 Sheets-Sheet 3

INVENTOR.
HUBERT J. ELINEAU
BY
*Henry C. Westin*
HIS ATTORNEY

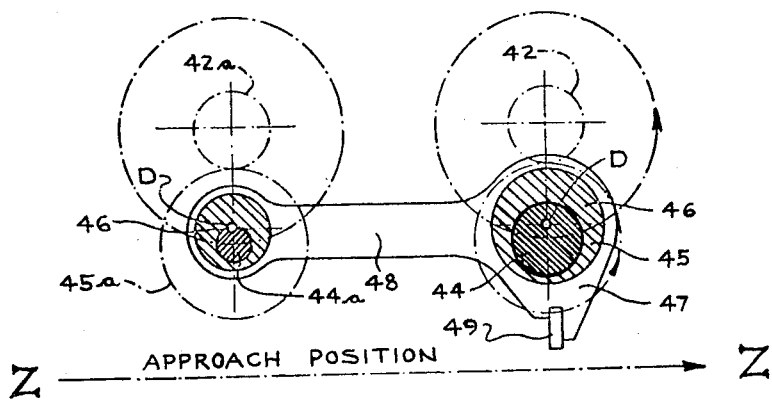
Fig. 9 APPROACH POSITION
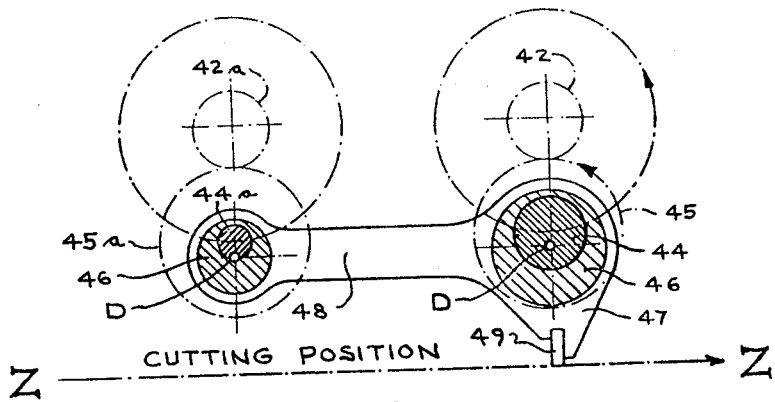
Fig. 10 CUTTING POSITION

United States Patent Office 3,269,245
Patented August 30, 1966

3,269,245
FLYING SHEAR WITH CONSTANTLY ORIENTED TOOL AND MISCUT FEATURES
Hubert Jean Elineau, Versailles, France, assignor to Societe Pour l'Etude et la Construction d'Installations Metallurgiques, a corporation of France
Filed Feb. 23, 1965, Ser. No. 434,475
Claims priority, application France, Mar. 9, 1964, 966,674; Dec. 15, 1964, 998,612
12 Claims. (Cl. 83—305)

The cutting of rolled products as they are delivered from the mill has for quite a number of years posed difficult problems which technicians have been trying to resolve, without complete success.

Thus numerous types of flying shears are known that operate fairly satisfactorily for relatively low rolling speeds, but the constant increase of these speeds has also considerably increased the difficulties, at least when it comes to cut stock with a relatively large section. Indeed, the momentum that is necessary to impart to such shears then becomes important. Moreover, if such momentum can be obtained, if necessary, for low rolling speeds because of the required time available, on the other hand, for higher rates of speed this momentum must be obtained within a very short time and requires the use of a very powerful motor, at least if it is desired to obtain a cut with each rotation of the drive shaft. Furthermore, the generated forces of inertia are then considerable and raise and drop very quickly.

As a result thereof a satisfactory flying shear, e.g. for medium-size billets delivered from a mill at a rate on the order of 5 mtrs./second at the maximum can be used only to cut products of the same section at a higher rate of speed.

On the other hand, the power of the motors required to operate these shears and overcome their inertia leads to the utilization of clutches that are very large and, consequently, do not permit adequate precision for close tolerances (e.g. ±15 mm.).

The application of known flying shears intended to cut heavy sections at speeds exceeding 5 mtrs./second would lead to an increase in the power of the motors and, consequently, of the capacity of the clutches in such proportions that this solution cannot be considered.

The object of the invention in one form is to produce a flying shear for rolled products having a speed of the order of 12 mtrs./second or more and to cut, at these speeds, products having a sectional surface that may attain about 700 mm.$^2$.

These objects can be attained thanks to the fact that the shear according to the invention has a kinematic device with very low inertia, remarkable especially in that it is adapted so that the jaws of the shear are in cutting position only after at least two revolutions of the motor shaft, said jaws passing, after at least one revolution of the motor shaft, through a so-called "approach position," in which the cutting edge of the blade of the jaw is exactly in the plane in which it arrives when said jaw is in the cutting position, but it only approaches the product, without cutting it.

Because of this arrangement it is possible to obtain a highly flexible utilization of the shear, due to the fact that it is then possible to increase the starting time of the shear as well as its stopping time.

In addition thereto, in the kinematic device of the shear according to the invention, the speed of the cutting head is added to the driving speed proper, which makes possible the following:

To reduce appreciably the power of the driving motors of the shear;

The start of the motors with each cut;

The elimination of the clutches and of the inertia flywheels;

To obtain a very high shearing force for a reduced motive power, in comparison with the hitherto known shears.

According to a preferred embodiment of the flying shear covered by the invention, the kinematic device comprises in combination: a jaw, constituted by a small horizontal connecting rod having a head carrying a cutting blade, carried at its ends by two eccentric shafts integral with two large-diameter gears forming planet or planetary gears loosely mounted on the pins of two parallel cranks synchronized in rotation, said planet gears each engaging with a nonrotating center pinion having a smaller diameter, mounted coaxially with the axis of each one of the cranks, and a similar, but opposite hand kinematic device, opposite said jaw.

Thanks to this device, the cutting blade describes a lengthened epicycloidal path during which it is maintained parallel with the axis of the passage of the product.

According to another feature of the invention the arrangement is such that the peak of this travel, at the moment of the cut, is in the vicinity of the plane of the passage of the product, on a perpendicular to said plane, said perpendicular joining between them the axes of the center pinions, of the planetary gear and the cutting edge of the blade.

According to still another feature of the invention, the ratio between said center pinions and planetary gears ranges between ½ and ⅕, and it is preferably ⅓.

According to a preferred mode of operation, the counteracting device representing the second jaw of the shear is similar to the device of the first jaw.

Other features of the invention will become more evident in the course of the description that is to follow.

Figure 2:
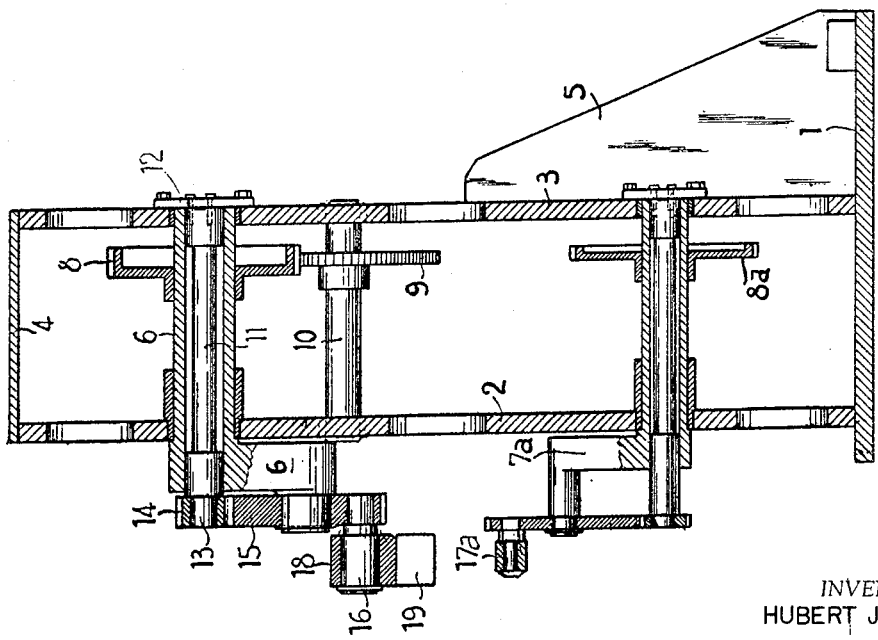
Figure 4:
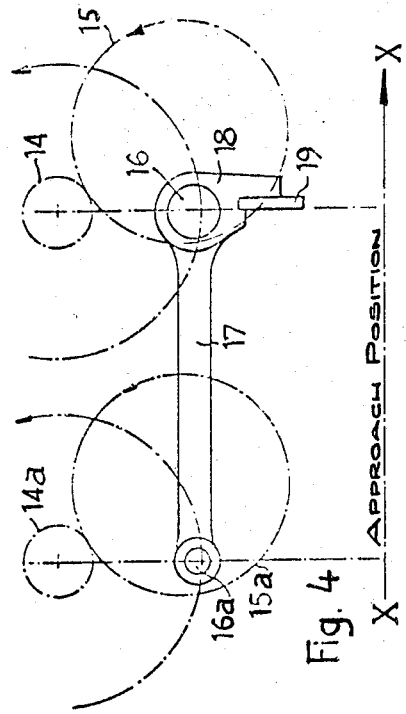
Figure 6:
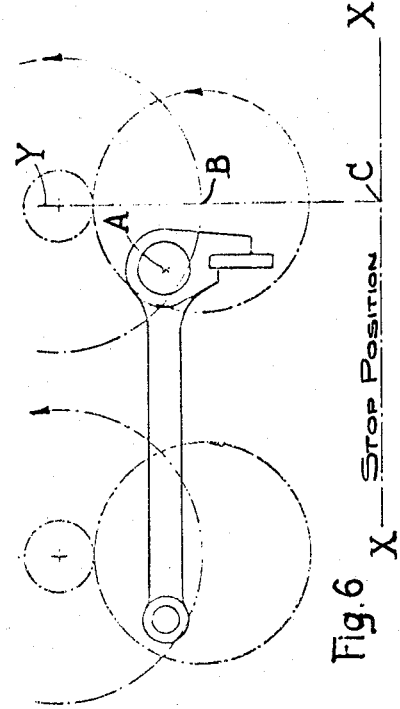
Figure 3:
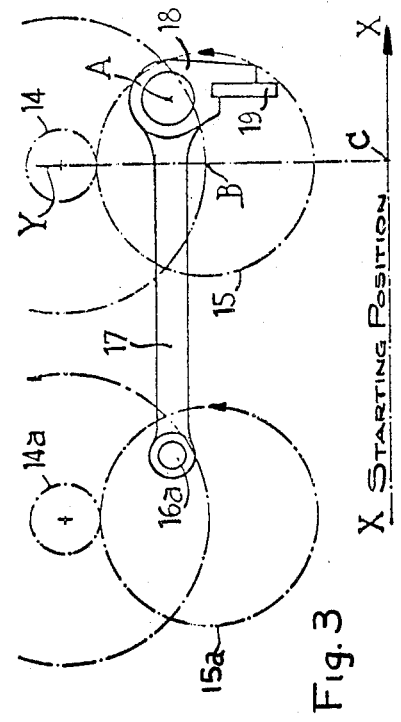
Figure 5:
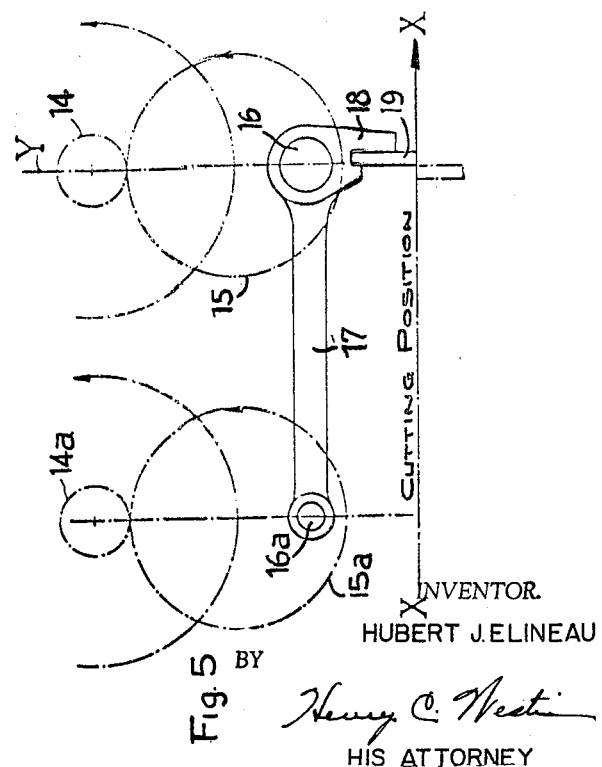
Figure 7:
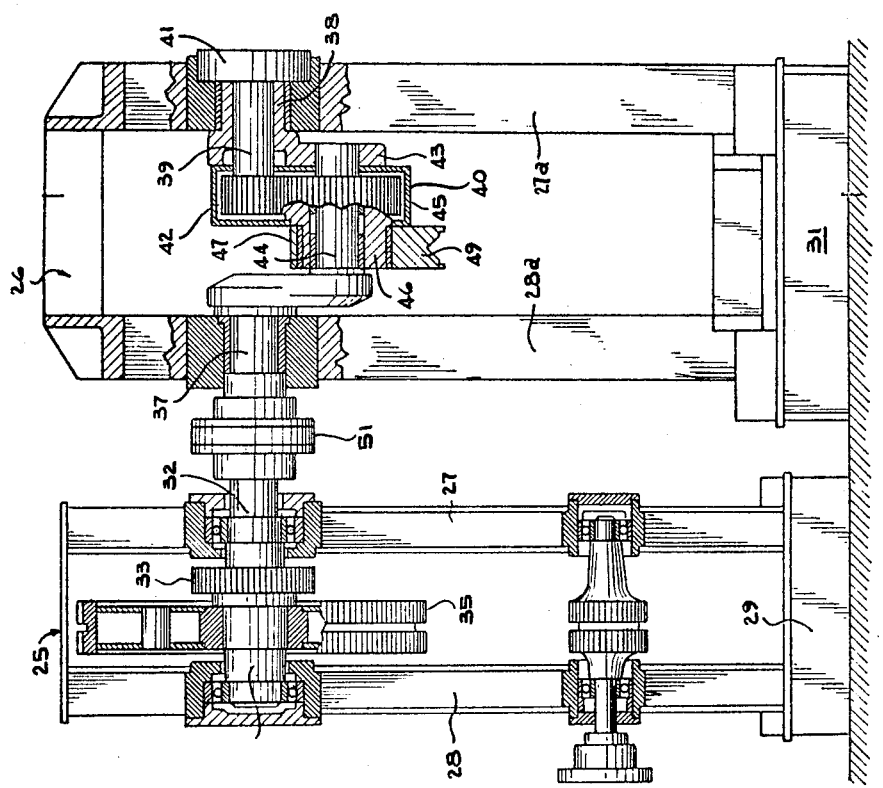
Figure 8:
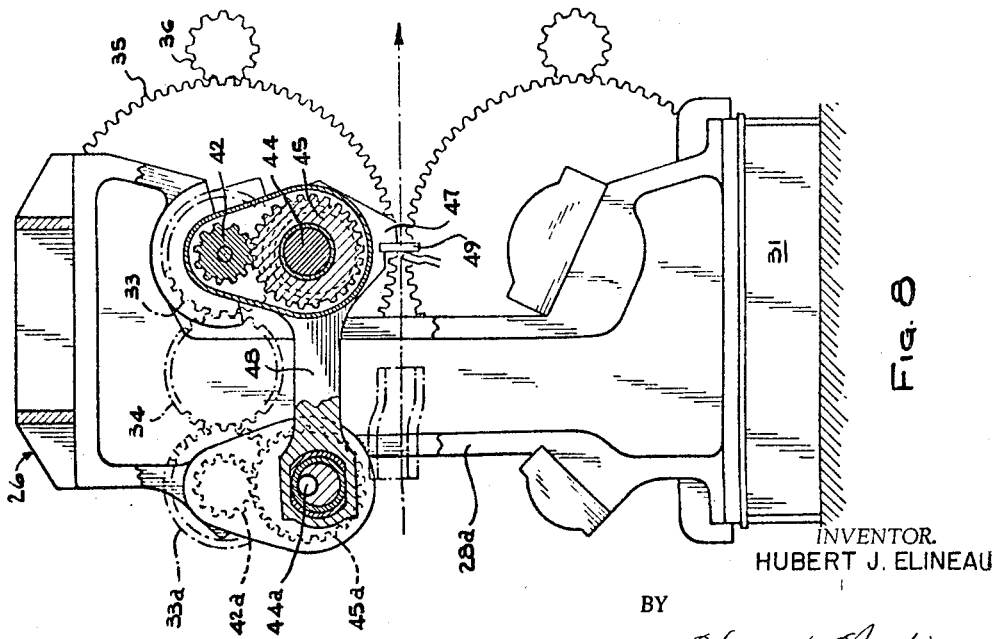

In the attached drawings, given solely as an example:
FIGURE 1 is a side view of a flying shear built in accordance with the present invention;
FIGURE 2 is a sectional view taken along the plane of line 2—2 of FIGURE 1;
FIGURE 3 is a schematic view showing the small connecting rod carrying the shearing head in the "starting" position;
FIGURE 4 is a similar schematic view showing the connecting rod in the "approach" position;
FIGURE 5 shows the head in the "cutting" position;
FIGURE 6 shows the head in the "stop" position;
FIGURE 7 is an elevational view, partly in section, of a second embodiment of the present invention;
FIGURE 8 is a view taken along lines VIII—VIII of FIGURE 7; and
FIGURES 9 and 10 are schematic views of the upper blade assemblies of a shear shown in FIGURES 7 and 8 indicating the approach position and cutting position, respectively.

With reference to FIGURE 1, the shear consists of two counteracting devices (I and II) of jaws disposed on either side of a horizontal plane (X—X) according to which the stock to be sheared passes from the left to the right as one looks at this figure.

These two devices (I and II) being identical in the embodiment represented, only one will be described in detail; namely, the device (I) of the jaw located above the plane X—X, although the elements of the device (II) will be identified.

The shear comprises a frame made up of a base plate 1 to which are fixed two parallel and vertical front and rear side-plates 2 and 3, a cross-piece 4 at its upper part and at least one corner plate or other reinforcing member such as 5, joining the rear side plate 3 with the base 1. Two cranks 6 and 7 are pivoting in the side-plates 2, 3, their webs and pins extending outwardly from the front side-plate 2. The journals of the cranks 6 and 7 are bored axially throughout their entire length and they are parallel to one another, their axes being in a plane that is also parallel with the plane X—X. Two gears 8 and 8a having the same diameter and the same number of teeth are fixed between the side-plates 2 and 3 on the journals or shafts of the cranks 6 and 7. These gears 8 and 8a both mesh with a third gear 9 fixedly mounted on a shaft 10 in a manner so that it can be driven by a motor (not shown).

As shown in FIGURE 2, shafts 11 and 11a pass through the axial bore of each one of the journals of the cranks 6 and 7, one end of each of these shafts 11 and 11a being immobilized in rotation on the rear side-plate 3 by means of any suitable device represented schematically at 12, as shown in FIGURE 2, and its opposite end 13 and 13a extends from the journal 6 or 7 of the crank and carries, fixed to it, a pinion 14 and 14a, which consequently is secured against rotation, the arrangement being such that each crank 6 and 7 turns in the side-plates 2 and 3 round each axle 11 and 11a, the crank pins being able to describe a circle round its pinion 14 and 14a, immobilized, the pinions 14 and 14a of each one of the axles 11 and 11a having the same number of teeth.

The pin of each one of the cranks 6 and 7 carries, loosely mounted, a planet wheel or gear 15, 15a meshing with the center pinion 14, 14a, and the ratio of the number of teeth of the center pinions in relation to the planet wheels is ⅓.

Each one of the planet wheels 15, 15a has an eccentric shaft 16, 16a and these shafts 16, 16a are connected by a connecting rod 17 having a head 18 carrying a cutter blade 19, thereby constituting one jaw of the shear, the arrangement being such that the connecting rod 17 is disposed horizontally in its lowest position, in the vicinity of the plane X—X, hereinafter referred to as "cutting" position, when the axle 13, the axle of the planet wheel 15 and the axle 16, on the one hand, and the axle 13a, the axle of the planet wheel 15a and the axle 16a, on the other hand, are aligned respectively on two straight lines perpendicular to the plane X—X of the passage of the stock to be cut.

It is possible thus to produce a kinematic device enabling to reduce appreciably the forces due to inertia, in which the axles 16, 16a each describe an extended epicycloid, and one will understand that the own speed of the planet wheels is being added to that of the cranks.

The shearing force acting principally upon the blade 19 carried by the head 18 of the connecting rod 17, it will be noted that the device comprising the crank 7, the center pinion 14a and the planet wheel 15a with its pin 16a is principally destined to support the end of the connecting rod 17 opposite the head 18 and to maintain said connecting rod in a horizontal position. As a result thereof the crank 7, the center pinion 14a and the planet wheel 15a can have a mass lesser than that of the corresponding elements carrying and actuating the head 18 of the connecting rod 17, which again permits to reduce the inertia of the unit.

The counteracting device (II) opposite the head 18 is, in a preferred embodiment of the invention, similar to the device described above. It is arranged below the plane X—X of the passage of the material and it also consists of an assembly of two cranks driven by gears and carrying center pinions and planet wheels whose axles are connected by a connecting rod 17a having a head 18a and a blade 19a, the whole unit being driven in the opposite direction, in a synchronized manner.

When the shaft 10 is put into rotation clockwise, as one looks at FIGURE 1, the pinion 9 puts the pinions 8 and 8a into rotation counterclockwise, and the pins of the cranks 6 and 7 cause the planet wheels 15, 15a to describe a circle round the center pinions 14, 14a, the planet wheels 15 and 15a both turning counterclockwise, i.e. in the direction of the passage of the stock. The axles 16, 16a are displaced in synchronism and describe an extended epicycloid by maintaining the connecting rod 17 in a horizontal position over the entire range of travel.

When the axles 16, 16a carrying the jaw are at the peak of the epicycloid close to the plane X—X, the epicycloidal travel of the cutting edge of the blade 19 is tangential to this axle, the same as the cutting edge 19a of the counteracting device II. The shear is then in its cutting position as shown in FIGURE 3.

The ratio of the number of teeth between the gear 14 and 15 on the one hand and 14a and 15a on the other hand being ⅓, the axles 16, 16a are displaced angularly by 120° in relation to their initial position when the pins of the cranks 6 and 7 perform one complete revolution round the axes of the center pinions 14 and 14a.

The operation proceeds as follows: The operating motors are started so as to cause the pins of the cranks to turn counterclockwise when the machine is in the position represent in FIGURE 3, i.e. the "starting position," in which the straight line Y joining the axes of the gears 14 and 15 is perpendicular to the plane X—X and the angle ABC is equal to 120°. Point A designating the axis 16, point B the axis of the planet wheel 15 and point C the intersection of the straight line Y with the plane X—X of the passage of the product to be cut.

After having described a little more than one complete revolution, i.e. about 390° from the initial position represented in FIGURE 3, the jaw reaches the position shown in FIGURE 4, in which the axes 16, 16a and consequently point A are on the vertical such as Y lowered to the plane X—X from the axes of the center pinions 14 and 14a. In this position, the so-called "approach position," the blade 19 of the head 18 is exactly in the plane in which it arrives when the jaw is in the cutting position, i.e. on the perpendicular Y to the plane X—X starting from the center pinion 14. However, the axis of the planet wheel 15 is then shifted by about 30° after having cleared this vertical towards the right as one looks at FIGURE 4, and the blade 19 does not move closer to the plane X—X when the rotation of the cranks continues and, consequently, the blade 19 will not cut the product. One might, therefore, call this position "not-cut" or "dummy-cut" position.

The rotation continues and, after having completed its second revolution, i.e. after having turned about 350° following the "approach" position, the crank moves the planet wheel 15 and its axle or pivot 16 to the "cutting" position shown in FIGURE 5. The material is then cut and the rotation of the cranks can be stopped after one more complete revolution, when the jaw is in the "stop" position represented in FIGURE 6.

This position is similar to and symmetric with the position represented in FIGURE 3, the angle ABC being also equal to 120°, with point A, however, being on the opposite side in relation to the vertical Y.

The cranks can then be used to turn one complete revolution in reverse, in order to bring the jaw into the "starting" position. A new cycle can then be performed.

It can be seen that this device permits the blades to be kept parallel to each other and perpendicular to the axis of the passage of the product, which enables clean cuts to be obtained without deformation or scoring of the end of the bars or other rolled materials.

Furthermore, the forces of inertia being reduced and the own speed of the planet gears being added to that of the cranks, it is possible to lower the speed of the latter and to reduce the power of the motors, which permits to increase the launching time, to cause the motors to start with each cut and to eliminate the clutches or couplings as well as the inertia fly-wheels. The low acceleration required to start the unit permits quite easily the attaining of the present high rolling speeds.

The shear illustrated in FIGURE 1 is capable of following rates on the order of 12 mtrs./s. or more, and to cut, at these speeds, products having in section a surface that may attain 700 mm.$^2$.

FIGURES 7–10 illustrate the flying shear of the type described in FIGURES 1–6, provided with a device enabling it to cut products with a section exceeding 700 mm.$^2$, on the order of 15,000 mm.$^2$ at slightly lower speeds.

The flying shear of the type described in FIGURES 1–6 has in combination a jaw consisting of a horizontal small rod or link with head carrying a blade mounted with its ends on two eccentric shafts integral with two large-diameter gears forming satellites loosely mounted on the pins of two parallel cranks synchronized in rotation, the satellites each gearing with a non-rotating center pinion having a smaller diameter, mounted coaxially to each one of the cranks, and a similar device opposed to said jaw.

In the embodiment of FIGURES 7–10 the satellite gears are mounted closely on the pins of two double cranks, or crankshaft, parallelly synchronized in rotation, and the eccentric shafts integral with said satellites surrounding the shafts of the satellites.

According to another feature of the second embodiment, the shear comprises two parallel vertical frames arranged side by side, one of the frames carrying the driving members of the shear and the other one the active members of the shear, i.e. the crankshafts and the kinematic device of the center pinions and satellite gears, the crankshafts being connected to shafts extending beyond said first frame by means of a removable coupling device.

With reference to FIGURES 7 and 8, there are provided two separate frames 25 and 26 arranged side by side, each consisting of two parallel columns 27 and 28 and 27a and 28a secured to bases 29 and 31, respectively.

The shafts 32, only one of which is visible in FIGURE 7, each carry a gear 33, 33a, these two gears having the same number of teeth and engaging a gear 34 arranged between them, also having the same number of teeth. By reason of this disposition as shown in FIGURE 8, the shafts 32 are synchronized in rotation in the same direction. One of the shafts 32 carries fixed to it a large diameter gear 35 meshing with a pinion 36 integral, for example, with the shaft of a driving motor (not shown).

It will be noted that, like the shear described in FIGURES 1–6, the shear according to FIGURES 7 and 8 has two similar antagonistic jaw devices, therefore, only one of them will be described here. The ends of the shafts 32 extend beyond the column 27, as represented in FIGURE 7, to permit their connection with the active members of the shear (kinematic device), carried by the frame 26 by means of a suitable connecting device.

In the frame 26, two horizontal and parallel cranks 37 turn in the column 28a and extend beyond this column, in the direction of the column 27 of the frame 25 to permit their connection with the shafts 32 of the driving device. Two parallel horizontal shafts 39 turn in the column 27a, to the right of the shafts of the cranks 37 turning in the column 28a. The external ends of the shafts 39 each have an enlarged head 41 which is solid with the column 27a to secure the shafts 39 against rotation.

The internal ends of the shafts 39 each have, fixed to it, a center gear 42, 42a which, consequently, cannot turn. A member 38 surrounds coaxially each one of the shafts 39 and it can rotate round the latter in the column 27a. This member 38 has an integral part 43 extending radially in relation to the shaft 39 and pierced by a hole into which penetrates the pin 44, 44a, of the crank 37.

Each satellite gear 45, 45a meshing with the center pinions 42, 42a is mounted loosely on one of the pins 44, 44a through a hub 46 surrounding the pin 44, 44a on almost its entire length; the hub 46 extending laterally from the internal side of the satellite gears 45, 45a. The external periphery of the hub 46 is circular, its axis is parallel with the axis of the pin 44, but set off in relation to the latter. In other words, the external circumference of the hub 46 is eccentric in relation to the axis of the pin 44 and this circumference is surrounded concentrically by the head 47 of the connecting rod 48 carrying the cutter blade 49. The disposition of the other end of the connecting rod 48, opposite the blade 49, is similar to the disposition just described. Provided furthermore is a case 40 housing the gears 42 and 45, this case having an opening through which is extending the hub 46 of the satellite 45.

It will be noted that the arrangement of the cranks 37, the shafts 39 and the member 38 actually produces two crankshafts arranged horizontally and parallelly between themselves. In order to be able to connect the cranks 37 with the shafts 32, there is provided a demountable coupling device 51 of any suitable type. In this way it is possible to disengage the kinematic device of the drive members, thereby facilitating the maintenance and repair works of the shear.

As a result thereof the connecting rod 48 is supported between two support points on either side instead of being overhung. This mounting also permits to reduce the space separating the eccentric shafts carrying the ends of the connecting rod from the shafts of the satellites.

In the embodiment represented, the ratio of the center pinion-satellite gears 42 and 45 is ½, but it can also be modified up to a ratio of ⅕.

The operation of the kinematic device described above is similar to the function of the device described in regard to the shear of the earlier figures, i.e.: when the drive motors are started, the crankshafts are driven in synchronism through the gears 35, 33 and 34. The satellites 45 and 45a driven by the pins 44 and 44a turn round the center gears 42 and 42a by meshing with them, and in turn drive the eccentric hubs 46 carrying the ends of the connecting rod 48.

As a consequence thereof, the jaw constituted by the connecting rod 48 passes through a position called "approach" (see FIGURE 9) in which the blade, the axes of the pins, of the hubs 46, of the satellites 45 and 45a and of the center gears 42 and 42a are simultaneously aligned on one and the same vertical in relation to the axis of the passage of the product at each end of the connecting rod. In this position, however, the axis D of the hub 46 is between the axis of the satellites 45 and 45a and the axis of the center gears 42 and 42a. The jaws thus approach one another without however cutting the product.

With the rotation continuing, the jaw pass through the "cutting" position represented in FIGURE 10. This position is similar to the one represented in FIGURE 9 as far as concerns the alignment of the axes of the different elements on a perpendicular to the axis Z—Z, however, in this position, the shafts of the satellites 45 and 45a are between the shafts of the center gears 42 and 42a and the shafts D of the hubs 46, and the jaws sever the product.

It is understood that the invention is not limited to the embodiment represented and described, which has been selected as only an example. Thus the counteracting device to the jaw may be replaced by any other suitable mechanism, for example, by a simple drum forming an anvil and turning at the tangential speed of the product.

I claim:
1. In a flying shear having two movable blades comprising a first kinematic system for one of the movable blades wherein said first system comprises:
   a jaw formed by a horizontal connecting rod, a head carried by said rod and one of the blades of the shear secured to said head,
   said jaw carried at its opposite ends by two eccentric shafts each formed integral with a relatively large di- ameter gear, wherein said gears function as planetary gears, said gears being carried by two parallelly rotatably mounted cranks synchronized in rotation, said planetary gears, each meshing with a non-rotating center gear of relatively small diameter, each of said center gears being mounted coaxially with the axis of one of said cranks, and a second kinematic system for said other blades of the shear.

2. In a flying shear, according to claim 1, wherein said first kinematic system imparts to its shear blade an epicycloidal path of travel and wherein at the moment of the cut the peak of the epicycloidal path of travel is in the vicinity of and in a plane perpendicular to the passage plane of the product, said perpendicular plane passing through the axes of the planetary gear, of the center gear, and the cutting edge of the associated blade.

3. In a flying shear, according to claim 1, wherein the ratios between said planetary gears and center gears range between one-half and one-fifth.

4. In a flying shear, according to claim 1, wherein said non-rotating center gears are formed integral with shafts secured against rotation, said shafts passing coaxially through central bores formed in said cranks.

5. In a flying shear, according to claim 1, wherein said second kinematic device is constructed similar to said first kinematic device and arranged to cause the blade associated therewith to move in the direction of the other blade at the moment of the cut.

6. In a flying shear, according to claim 1, wherein said planetary gears are loosely caried by pins carried by said cranks, said eccentric shafts formed integral with said planetary gears and arranged radially outward of said pins of said planetary gears.

7. In a flying shear, according to claim 1, including a first and second vertical frame arranged side by side, drive members for driving said kinematic system, said drive member carried by said first frame, the elements of said kinematic system carried by said second frame, and said driving members and kinematic system being connected together by a removable coupling.

8. In a flying shear, according to claim 7, wherein said center gears are mounted fixedly on shafts supported by said second frame, members carried by said supporting shafts of said center gears and rotatable relative thereto having a portion for receiving and supporting said eccentric shafts.

9. In a flying shear, according to claim 1, said planetary gears each including a coaxial hub, by means of which said planetary gears are mounted on said eccentric shafts, the periphery of said hubs being eccentric in relationship to the axes of said eccentric shafts.

10. In a flying shear, according to claim 9, wherein said connecting rod is mounted on the periphery of said hubs for rotation coaxially thereabout.

11. In a flying shear, according to claim 9, including a housing enclosing each planetary gear and center gear having an opening for receiving a portion of said associated hub.

12. In a flying shear having two cooperative movable blades adapted in one instance to perform a cut on material fed therebetween and in another instance to miss one or more cuts, comprising:

a head to which one of said blades is secured, a first kinematic system for said blades and head, including a link connected to said head, two spaced-apart shafts eccentrically carrying the opposite ends of said links, two rotatably mounted driven cranks synchronized in rotation, each carrying one of said shafts and causing a first controlled displacement of said blade about the circle of travel of said cranks, a rotatable gear for said shafts drivenly associated therewith and displaceable with the shafts about the circle of travel of said cranks, a non-rotating gear for each rotatable gear for effecting rotation of said rotatable gears and said shafts to cause a second controlled displacement of said blade and to cause said blade to miss a cut, said gears bearing a planetary relationship to each other and the ratios thereof controlling the number of times said blade is caused to miss a cut, and a second kinematic system for said other blades of said shear.

References Cited by the Examiner
UNITED STATES PATENTS 1,140,392   5/1915   Novick _____ 83—328
2,878,869   4/1959   O'Brien _____ 83—305

WILLIAM W. DYER, Jr., *Primary Examiner.*

LEIGH TAYLOR, *Examiner.*